B. FISCH & J. WALDMAN.
HANDLE FOR POCKET BOOKS.
APPLICATION FILED MAY 5, 1917.
1,248,100.   Patented Nov. 27, 1917.
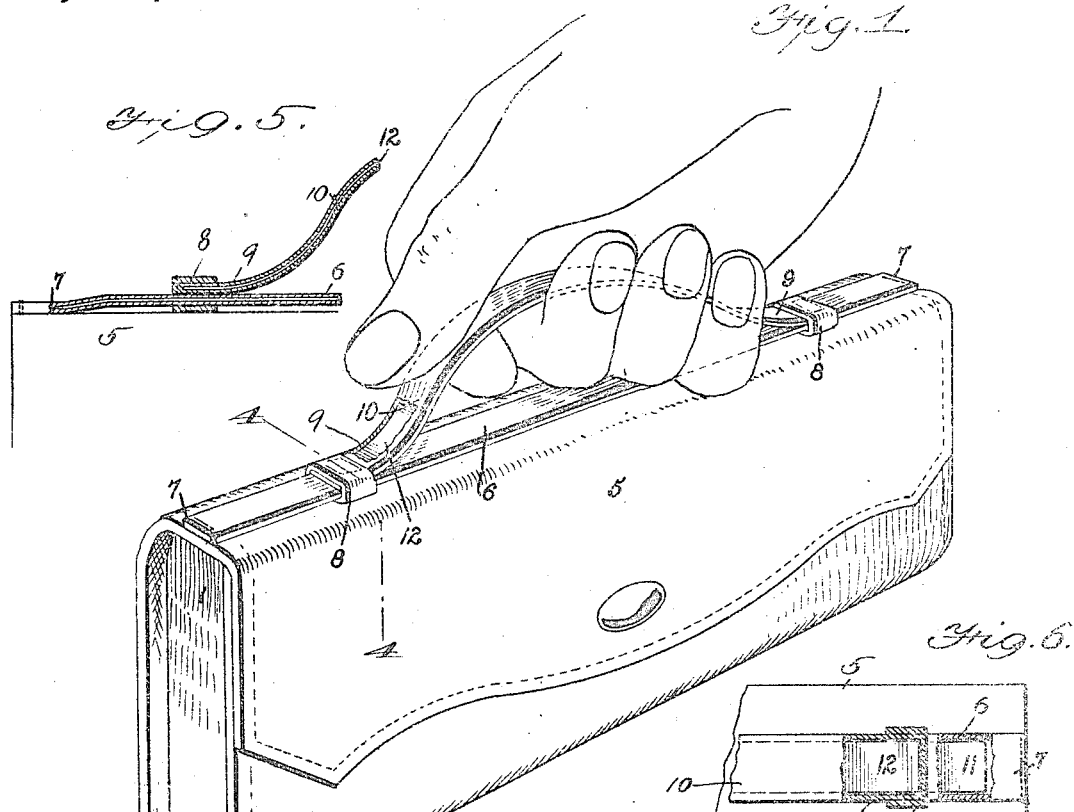
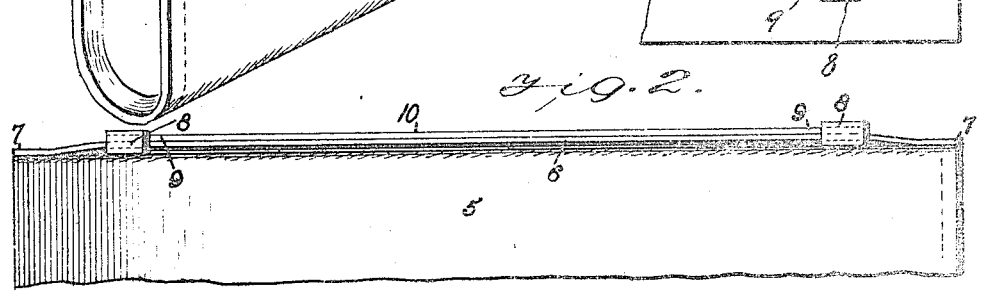
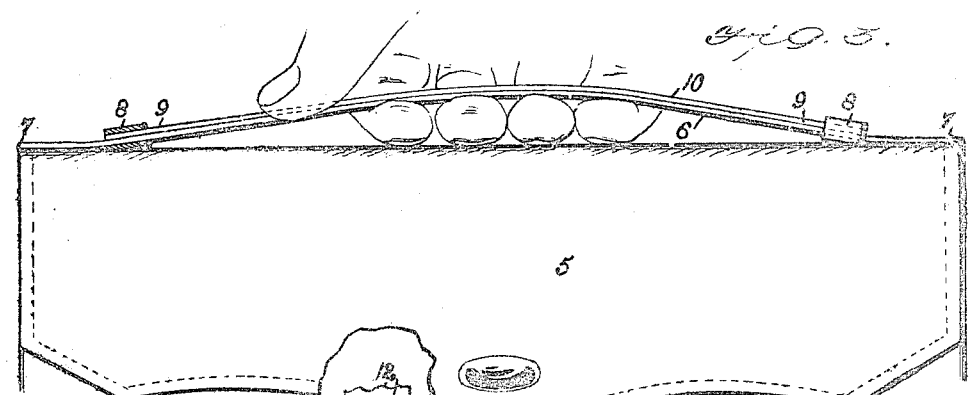
WITNESSES
INVENTORS
Benjamin Fisch
Joseph Waldman
BY
ATTORNEYS

UNITED STATES PATENT OFFICE.

BENJAMIN FISCH AND JOSEPH WALDMAN, OF BROOKLYN, NEW YORK.

HANDLE FOR POCKET-BOOKS.

1,248,100.

Specification of Letters Patent.

Patented Nov. 27, 1917.

Application filed May 5, 1917. Serial No. 166,520.

*To all whom it may concern:*

Be it known that we, BENJAMIN FISCH and JOSEPH WALDMAN, both citizens of the United States, and residents of the city of New York, borough of Brooklyn, county of Kings, and State of New York, have invented a new and Improved Handle for Pocket-Books, of which the following is a full, clear, and exact description.

Our invention has for its object to provide a handle for pocket books combining a main tight handle and a long loose auxiliary handle. The main handle is secured at its ends to the pocket book, and two sleeves are slidably mounted on the main handle to which the ends of the auxiliary loose handle are secured. The auxiliary loose handle is disposed flat against the main handle when the latter is used, the sleeves being drawn in the direction of each other to permit of the use of the auxiliary loose handle when desired.

Additional objects of the invention will appear in the following specification, in which the preferred form of the invention is disclosed.

In the drawings similar reference characters denote similar parts in all the views, in which—

Figure 1 is a perspective view illustrating a pocket book provided with our handle, and showing how the long loose handle is used.

Fig. 2 is a fragmentary view illustrating the position of the handle when the pocket-book is not in use;

Fig. 3 is a view similar to that illustrated in Fig. 2, illustrating the use of the main handle;

Fig. 4 is a fragmentary sectional view on the line 4—4 of Fig. 1;

Fig. 5 is a fragmentary longitudinal sectional view showing the springs in the handles; and Fig. 6 is a fragmentary plan view of the pocket-book showing the construction of the handles.

By referring to the drawings it will be seen that the pocket book 5 is provided with a main tight handle 6, the ends 7 of which are secured to the ends of the pocket book 5. Mounted on this main handle 6 there are two sleeves 8, and to these sleeves 8 are secured the ends 9 of a loose auxiliary handle 10.

When a tight handle is desired, the long loose handle 10 is disposed flat against the main handle 6, as illustrated in Figs. 2 and 3 of the drawings, and the pocket book is carried by grasping the main handle 6 and the auxiliary handle 10, as illustrated in Fig. 3 of the drawings. When it is desired to use a long loose handle, the sleeves 8 are moved in the direction of each other as illustrated in Fig. 1 of the drawings, so that the long loose handle 10 is formed in a loop to permit of the pocket book being carried as illustrated in Fig. 1 of the drawings.

It will be understood that should the long loose handle 10 become damaged in any way, it may be removed, together with the sleeves 8, the pocket-book then being provided with a tight handle such as is customarily employed.

We prefer to dispose the sleeves 8 not only around the main tight handle 6, but also around the ends 9 of the long loose handle 10, and secure the sleeves to the ends of the long loose handle 10, as illustrated in Fig. 4 of the drawings. This gives the handle a neat appearance.

A leaf spring 11 is embedded in the handle 6, and a leaf spring 12 is embedded in the handle 10, these springs 11 and 12 being provided for holding the handles 6 and 10 flat against the pocket book when not in use. When only the upper handle 10 is used the spring 11 in the handle 6 holds it flat against the pocket book.

It will be understood that the handle may be used not only on pocket books but also on purses, brief cases, vanity cases and music rolls.

Having thus described our invention, we claim as new, and desire to secure by Letters Patent:

1. In combination with a pocket book, a main handle secured at its ends to the pocket book at points spaced apart a distance substantially the same as the length of the main handle, an auxiliary handle the length of which is less than the length of the main handle, and two sleeves slidably mounted on the main handle, to which the ends of the auxiliary handle are secured.

2. In combination with a pocket book, a main handle secured at its ends to the pocket book at points spaced apart a distance substantially the same as the length of the main handle, an auxiliary handle, the length of which is less than the length of the main handle, means movably mounted on the main handle, to which the ends of the auxiliary handle are secured, which permit the auxiliary handle to move from a position against the main handle to a position where the central portion of the auxiliary handle is spaced from the main handle, and means for holding one of the handles flat against the pocket book.

BENJAMIN FISCH.
JOSEPH WALDMAN.